(12) United States Patent
Meketa

(10) Patent No.: US 8,516,486 B2
(45) Date of Patent: *Aug. 20, 2013

(54) LOADING APPLICATIONS IN NON-DESIGNATED ENVIRONMENTS

(75) Inventor: Deneb Meketa, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,151

(22) Filed: Mar. 23, 2012

(65) Prior Publication Data

US 2013/0167150 A1    Jun. 27, 2013

Related U.S. Application Data

(63) Continuation of application No. 11/677,557, filed on Feb. 21, 2007, now Pat. No. 8,146,084.

(51) Int. Cl.
*G06F 9/46* (2006.01)
*G06F 12/14* (2006.01)
*G06F 7/04* (2006.01)

(52) U.S. Cl.
USPC ............................. 718/100; 726/21; 726/27

(58) Field of Classification Search
USPC ..................... 718/100; 726/21, 27
See application file for complete search history.

(56) References Cited

U.S. PATENT DOCUMENTS

| | | | |
|---|---|---|---|
| 6,317,742 B1 | 11/2001 | Nagaratnam et al. | |
| 6,687,745 B1 | 2/2004 | Franco et al. | |
| 7,130,831 B2 * | 10/2006 | Howard et al. | 705/57 |
| 7,568,097 B2 * | 7/2009 | Burnett | 713/165 |
| 7,587,594 B1 | 9/2009 | Kavalam et al. | |
| 7,770,202 B2 | 8/2010 | Brumme et al. | |
| 2003/0041267 A1 | 2/2003 | Fee et al. | |
| 2005/0172286 A1 | 8/2005 | Brumme et al. | |
| 2006/0085789 A1 | 4/2006 | Laborczfalvi et al. | |

OTHER PUBLICATIONS

"Final Office Action", U.S. Appl. No. 11/677,557, (Sep. 1, 2011), 17 pages.

"Non-Final Office Action", U.S. Appl. No. 11/677,557, (Mar. 17, 2011), 19 pages.

"Notice of Allowance", U.S. Appl. No. 11/677,557, (Nov. 17, 2011), 16 pages.

* cited by examiner

*Primary Examiner* — Jennifer To
*Assistant Examiner* — Brian Chew
(74) *Attorney, Agent, or Firm* — Wolfe-SBMC

(57) ABSTRACT

This specification describes technologies relating to execution of applications and the management of an application's access to other applications. In general, a method can include loading a first application, designated to a first isolation environment, including first instructions using the first isolation environment provided by an application execution environment. A second application including second instructions is loaded using the first isolation environment despite the second application being designated to a second isolation environment provided by the application execution environment. The first application is prevented from modifying the second instructions of the second application. Data is processed using the first instructions of the first application and the second instructions of the second application, where the first instructions reference the second instructions. Information based on results of the processing is outputted.

18 Claims, 5 Drawing Sheets

LOADING APPLICATIONS IN NON-DESIGNATED ENVIRONMENTS

CROSS-REFERENCE TO RELATED APPLICATIONS

This application is a continuation application of, and claims priority to U.S. patent application Ser. No. 11/677,557, now U.S. Pat. No. 8,146,084, entitled "Loading Applications in Non-Designated Isolation Environments," to inventor Deneb Meketa which was filed on Feb. 21, 2007. The contents of the above application are herein incorporated by reference in their entirety.

TECHNICAL FIELD

The present disclosure relates to execution of applications and, in particular, the management of an application's access to other applications.

BACKGROUND

An application execution environment is a virtualization environment that works in conjunction with the native services (e.g., an operating system) of a computing device to provide a consistent well-defined environment in which applications can be loaded and executed. An application execution environment typically includes facilities such as memory management (e.g., garbage collection), standard libraries, media decoders, user interface frameworks and input-output interfaces. An application designed to run within an application execution environment can often be developed rapidly because developers can rely on the consistency of the application execution environment—even if the environment itself exists on widely varying systems.

An application execution environment can load an application from an encoded representation of the application. For example, the encoded representation can have a pre-defined syntactic structure such as a programming language (e.g., source code) or can include well-defined virtual instructions (e.g., platform-independent bytecode, such as Macromedia Flash® bytecode). To load applications the application execution environment decodes the encoded representation of the application into instructions and executes the instructions of the application. Application execution environments are sometimes referred to as interpreters or virtual machines.

When the loaded application is executed, the resources that the application is allowed to access are controlled by the application execution environment. For example, if an application is downloaded from the Internet, the application may be allowed to display information and receive user input, but may not be allowed to access an attached storage device.

An application can be classified such that the application's classification identifies a particular isolation environment within the execution environment with which the application is loaded. An application that has a different classification is loaded into a different isolation environment. An application loaded using one isolation environment is prevented from accessing, modifying or interfering with an application loaded using a different isolation environment. However, it is often desirable for an author of an application to reuse functionality of one application within another application, even if the two applications do not share the same classification.

Some application execution environments allow applications to explicitly establish inter-isolation-environment communication channels. Typically one or both of the applications must be explicitly designed to exchange data through an established channel.

SUMMARY

This specification describes technologies relating to loading one application with another application into the same isolation environment. In general, one aspect of the subject matter described in this specification can be embodied in a method that includes loading a first application including first instructions using a first isolation environment, which is provided by an application execution environment. The first application is designated to the first isolation environment based on first information associated with the first application. A second application including second instructions is loaded using the first isolation environment despite the second application being designated to a second isolation environment, which is provided by the application execution environment. The second application is designated to the second isolation environment based on second information associated with the second application. The first application is prevented from modifying the second instructions of the second application. Data is processed using the first instructions of the first application and the second instructions of the second application. The first instructions of the first application reference the second instructions of the second application. Information based on results of the processing is outputted. Other embodiments of this aspect include corresponding systems, apparatus, and computer program products.

These and other embodiments can optionally include one or more of the following features. The method can include determining that the second application consents to being loaded with the first application into the first isolation environment. Determining that the second application consents to being loaded with the first application can include identifying a security policy associated with the second application and matching the first application with the security policy. A load type associated with the second application can be identified. The load type can be selected from a group compromising: a) loading the second application as raw data accessible to the first application and b) loading the second application as playable media playable by the first application. The method can include identifying a third application that has a load type indicating that the third application be loaded as raw data where the third application includes third instructions. The third application can be loaded using the first isolation environment despite the third application being designated to a third isolation environment. The third application can be designated to the third isolation environment based on third information associated with the third application. The first application can be allowed to modify the third instructions of the third application. Referring to instructions of the second application can include referring to symbols of the second application using a syntax common with that employed for symbols of the first application. Loading the first application can include loading the first application from a first network location where the first network location corresponds to the first information; and loading the second application from a second network location where the second network location is distinct from the first network location and the second network location corresponds to the second information. The network location can correspond to a network domain. The first application can be prevented from reading the second instructions of the second application. Loading the first application can include loading from a public network and loading the second application can include loading from a private network. The second instructions can access a resource of the first application, where the resource of the first application can include one or more of: the first instructions and data associated with the first application. The method can include identifying, based on permissions associated with the first isolation environment, which environment resources in a plurality of environment resources are accessible to applications loaded in the first isolation environment. The application execution environment can be invoked from a web browser.

The subject matter described in this specification can be embodied in a computer program product, encoded on a computer-readable medium, operable to cause data processing apparatus to perform the operations described above. In addition, the subject matter described in this specification can be embodied in a system including a processor, and a computer-readable medium coupled with the processor and having encoded thereon an application execution environment configured to load applications while running on the processor, where the application execution environment is configured to perform the operations described above.

Particular embodiments of the subject matter described in this specification can be implemented to realize one or more of the following advantages. Applications can be isolated from one another while still allowing a first application to use the functionality of a second application as though both the first and second were not isolated from each other. Complicated calling conventions need not be employed to coordinate the use of functionality or resources of one application from another application. When a first application causes a second application to be loaded with the first application, the second application can be afforded the same accesses of the first application. Security policies can be used to assure that the second application consents to being loaded with the first application. The second application (the application whose functionality is used by the first) can refuse to be loaded with the first application.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
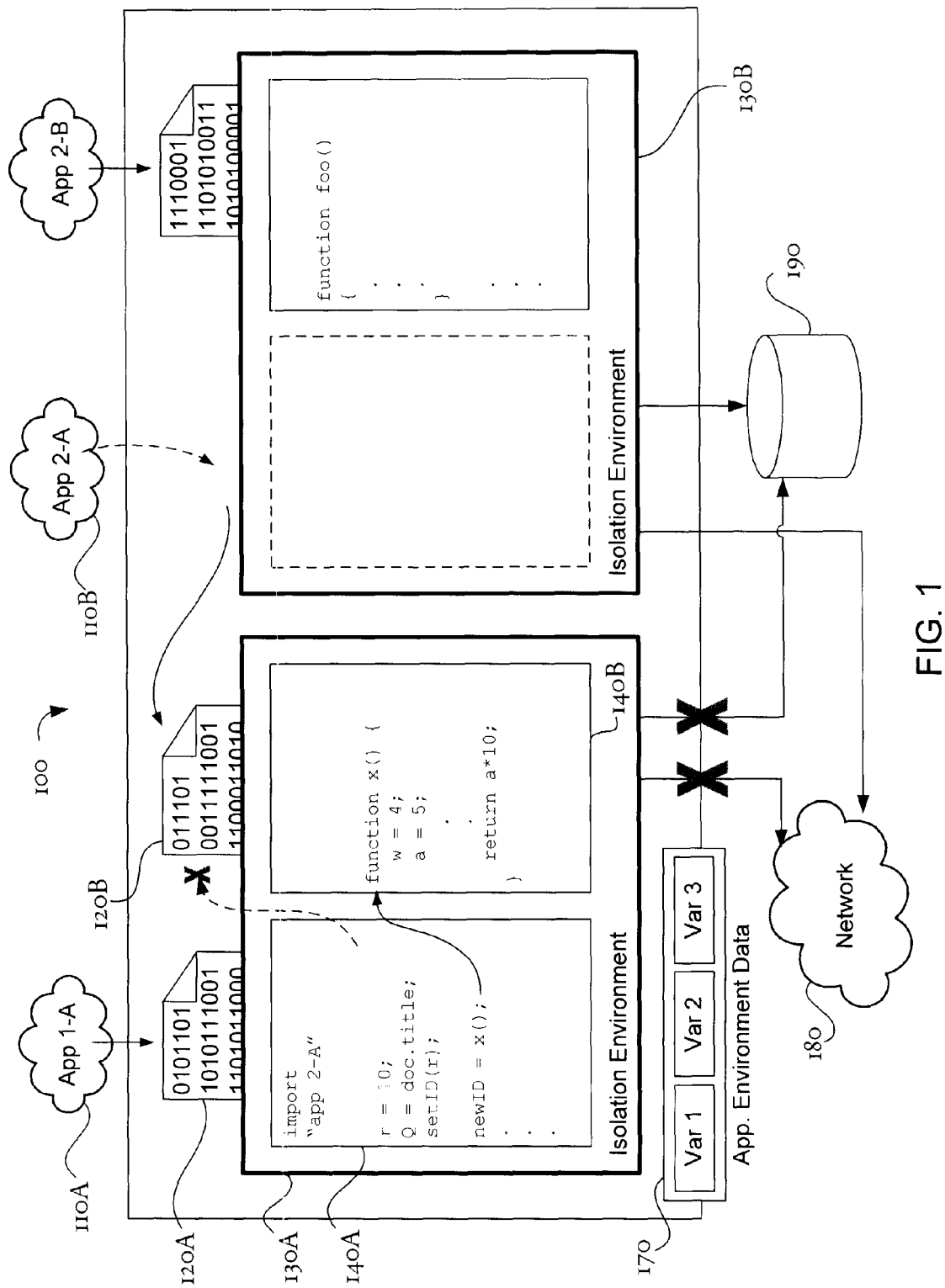
FIG. 1 is a diagram of an encoded representation of an application being loaded into an application execution environment.

FIG. 1 is a block diagram of an encoded representation of an application 120A being loaded by an application execution environment 100. The encoded representation of application 120A is decoded into the application 140A and loaded by the application execution environment 100 using the isolation environment 130A. In general, the application execution environment 100 includes multiple isolation environments 130 (e.g., the environment 130A and 130B). When executed, an application that has been loaded using an isolation environment is prevented from accessing, modifying or interfering with applications that have been loaded using other isolation environments. For example, an application of one isolation environment may not be permitted to call subroutines of or share data with another application of a different isolation environment. An isolation environment can also govern, with varying degrees of granularity, an application's access to resources (e.g., network, disk or input output devices) available through the application execution environment. In some implementations, each separate application is loaded using its own isolation environment, however in other implementations a group or a class of applications can share the same designated isolation environment.

Typically, information is associated with an application or its encoded representation 120 (e.g., the representation 120A and 120B). This associated information designates with which isolation environment 130 the application is loaded. For example, information associated with the application App 1-A can designate a first isolation environment 130A, while another application, App 2-A, is associated with information that designates a second isolation environment 130B. The associated information can be derived from the encoded representation of the application 120 itself (e.g., from an explicit designation in the encoded representation) or, for example, from a location 110 (e.g., location 110A or 110B) from where the encoded representation of the application 120 is received. The location 110 can correspond to a particular network location (e.g., network address or universal resource locator (URL)), which is used to designate a particular isolation environment. For example, all applications from www.foo.com can be loaded using one isolation environment while all applications from www.bar.com can be loaded using another isolation environment. The location 110 can correspond to an area of data readable from a disk or other computer-readable medium. Accordingly, a file path or database identifier specified by such a location can designate an application's isolation environment.

Applications can be loaded into the application execution environment in response to a user request or from other system generated requests originating from outside of the application execution environment. For example, the application execution environment can be invoked from web browser and the invocation can include a request to load a particular application from a particular location.

Additionally, an application can be loaded in response to instructions in another application. For example, the application 140A can request that the application from location 110B be loaded. In the following discussion, the application making the request is referred to as a host application, while the application to be loaded is referred to as the hosted application. In some implementations, instructions of the host application request that a hosted application be loaded. In other implementations, the host application can include information (e.g., in its encoded representation) that identifies the hosted application. This information can be read automatically by the application execution environment when the host application is loaded.

Loading an application generally includes receiving an encoded representation of the application from a particular location 110. The location can refer to a computer-readable medium, or a portion thereof, from where the encoded representation can be accessed and read by the application execution environment 100. In some implementations, the encoded representation corresponds to a particular file (e.g., a Macromedia Flash (SWF) file, an ActionScript (AS) file or a Flash Video (FLV) file), but in general, the encoded representation can correspond to one or more files, one or more entries in a database or the results of running another process, computation or program.

The encoded representation of the application is decoded into a series of instructions that can be executed by the application execution environment. The encoded representation can also include data such as numerical values, strings, data structures and media resources such as images, sounds, animations, video streams and other playable multimedia information. The instructions of the application, executed in conjunction with the application execution environment, operate on the application's data or data provided by the application execution environment. One such application execution environment is the Macromedia Flash Player available from Adobe Systems Incorporated of San Jose, Calif.

In response to the request by application 140A to load the application from location 110B, the application execution environment 100 loads the hosted application from location 110B using the first isolation environment 130A. The hosted application from location 110B is loaded using the same isolation environment 130A as application 140A despite information associated with the hosted application that designates the second isolation environment 130B. Thus the request by the host application overrides loading of the hosted application using the hosted application's designated isolation environment. Under other circumstances (e.g., a user request to load the application from location 110B by itself), the designation of the hosted application is honored and the application loaded using its designated isolation environment 130B.

In general, when an application is loaded using an isolation environment the application is prevented from interfering with or accessing applications loaded using another isolation environment. Access to the functionality of an application's instructions or the application's data is governed by the application execution environment and based on the isolation environment used when the application was loaded.

When the host and hosted application are loaded using the same isolation environment, the host application is able to refer to instructions of the hosted application (e.g., by calling or executing a method, function or subroutine of the hosted application). By referring to instructions, the functionality of a hosted application's instructions can be reused. The host application can also access data of the hosted application (e.g., by referring to data variables or data structures of the second application). Additionally, in some implementations, the hosted application can also refer to instructions and access data of the host application. Thus, when two applications are loaded using the same isolation environment the ability of the applications to refer to instructions or access each other's data is mutual.

The ability of the host application to refer to instructions of the hosted application does not necessarily imply access to the instructions themselves. Generally, the host application is not able to access (i.e., read) the instructions of the hosted application, a decoded manifestation of the instructions (e.g., as generated by the application execution environment) or the encoded representation of the hosted application. In general, the application execution environment, rather than the host application, reads the hosted application's encoded representation and interprets that representation as executable instructions and as accessible data.

In addition, access by an application to any of one or more resources—such as a network 180, a local disk 190 or application environment data elements 170—is determined based on the isolation environment of the application. When an application is hosted by another application, the hosted application is loaded using the isolation environment of the host application. Therefore, the access afforded to the hosted application is governed by the isolation environment of the host application. For example, application 140B, if loaded using its designated isolation environment 130B, may have access to both network resources 180 and disk resources 190. However, when the same application is loaded using isolation environment 130A, the application has the permissions associated with the isolation environment 130A, which may not include access to network resource 180 or disk resource 190.

In some implementations, isolation environments are associated with one or more permissions that are used by the application execution environment to determine limitations placed on any application loaded using the isolation environment. These permissions can, for example, identify, with varying levels of granularity, the extent to which an application can access resources, such as a network 180, a disk 190 or application environment data 170 maintained by the application execution environment. Any particular permission associated with an isolation environment can range in granularity both with respect to the permission granted and the resource to which the permission pertains. For example, a particular permission may govern whether an application can read and write, or merely read, a disk resource. Another permission can, for example, limit the amount or type of data read or written to a network, a particular network location or a particular disk location.

Figure 2:
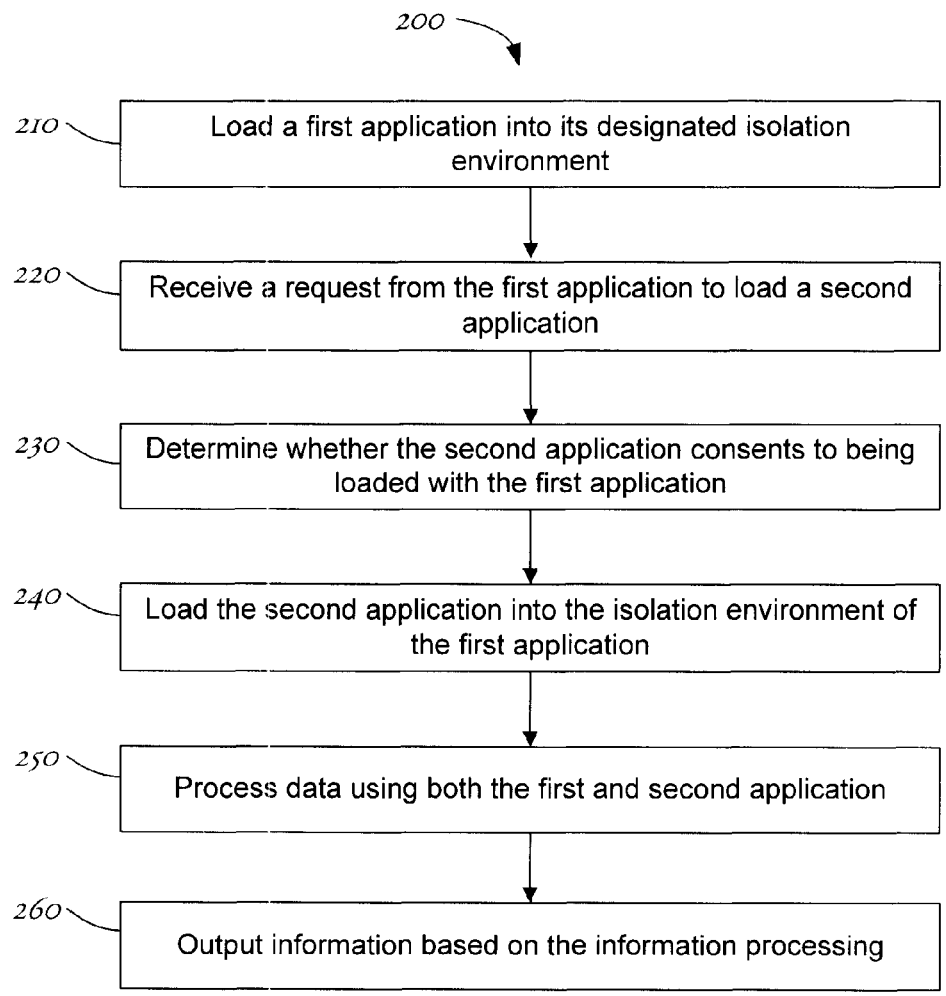
FIG. 2 is a flow diagram of an example process for loading applications.

FIG. 2 shows a flow diagram for an example process 200 for loading one application with another application using the same isolation environment. The first application is loaded 210 using its designated isolation environment. Loading includes reading an encoded representation of the first application from a particular location, for example a network, disk or memory location. The particular isolation environment is designated based on information associated with the first application. For example, the particular location can be specified as a URL in the form prot://sub.domain.com/path/file.swf, and the particular isolation environment can be designated based on the URL of the application. In some implementations, a portion of the URL can designate a particular isolation environment, such that, for example, all applications from sub.domain.com are loaded using the same isolation environment.

A request can be received 220 from the first application indicating that a second application be loaded. In some implementations, the first application requests the second application explicitly by accessing functionality provided by the application execution environment. For example, the first application can call a function, method or subroutine of an API (Application Program Interface) which requests that the second application, accessible at a given location, be loaded. In other implementations, the request can be made implicitly. For example, an implicit request can be made when the first application attempts to access data or call a function or method which is neither provided by the first application nor by the application execution environment. In such circumstances, the application execution environment can automatically attempt to locate (e.g., based on a catalog or library of applications) and load the second application. In another example, the first application can include an import manifest which identifies the second application. The import manifest can be included within the encoded representation, correspond to a separate file, or be generated programmatically.

In response to the request of the first application, the process 200 can determine 230 whether the second application consents to being loaded using the same isolation environment as the first application. The second application can include a security policy that identifies which particular applications should be allowed to load the second application. In some implementations, the security policy is included with an encoded representation of the second application. Alternatively, the security policy can be included in a separate security policy file that is associated with the second application. Security policies of hosted applications are described in further detail in association with FIG. 3. The security policy can be used by the application execution environment to determine that the second application consents to being loaded by the first application.

The second application, despite its associated information designating a second separate isolation environment apart from the first isolation environment, can be loaded 240 using the first isolation environment. In general, when the second application has been loaded, the first application can reference instructions and access data of the second application while both applications share the same isolation environment. The first application is permitted to use instructions of the second application (e.g., by calling functions, methods and subroutines of the second application) and to read or write data areas and data structures of the second application. The shared isolation environment however, does not necessarily allow the first application to read or alter the instructions of the second application. The first application can be prevented from modifying or, in some implementations, even reading the encoded representation of the second application. This prevents the first application from modifying, corrupting or otherwise adulterating the instructions of the second application.

Data is processed 250 by both the instructions of the first application and the instructions of the second application. The instructions of the first application can refer to instructions of the second application, typically to invoke functionality provided by the instructions of the second application. For example, the first application can invoke a method or function that corresponds to one or more instructions of the second application. The instructions of the second application may affect data associated with either the first or the second application. In some implementations, execution of instructions occurs synchronously (e.g., as if like a function call) or asynchronously (e.g., as if processed concurrently in a separate thread).

An application can invoke the functionality of another application's instructions or access another application's data by referring to a pre-defined symbol. The pre-defined symbol identifies a particular sequence of instructions or discrete data element. For data, the symbol corresponds to a variable, constant or data-structure defined by the application. For example, a host application can manipulate an image of the hosted application by referring to a particular array of pixels. For instructions, the symbol can correspond to a method, function or subroutine defined by the hosted application. For example, the host application can call a function implemented by the hosted application.

From the perspective of an application author, a host application refers to the instructions and data of a hosted application in the same manner and using the same syntax as the host application refers to its own instructions and data. For example, a host application may include the following instructions referring to its own data structures (e.g., the class "Square") and instructions (e.g., the method "print"):

```
var square:Shape = new Square("Blue");
square.print( );
```

While the same host application can refer to data structures (e.g., the class "Circle") and instructions (e.g., the method "radius") of the hosted application in an analogous fashion:

```
var circle:Shape = new Circle("Red");
circle.radius(1.0);
```

Information based on the results of the processing is output 260 to the user. For example, the results of processing can be used to provide a presentation of information to the user such as rendering an appearance on a display device. In other implementations, the output of information can be interceded by other operations. The results of the processing can be used to generate intermediate information that is stored or provided to an auxiliary process. For example, the data processed by the instruction of the first and second application can be stored in a database for subsequent access and manipulation by another method, process, application or user. The intermediate information may be manipulated by an auxiliary process in multiple operations or over a varying period of time. Thus output to the user does not necessarily mean immediate output to a display device, but rather, any output intended for later processing and delivery to a user.

Figure 3:
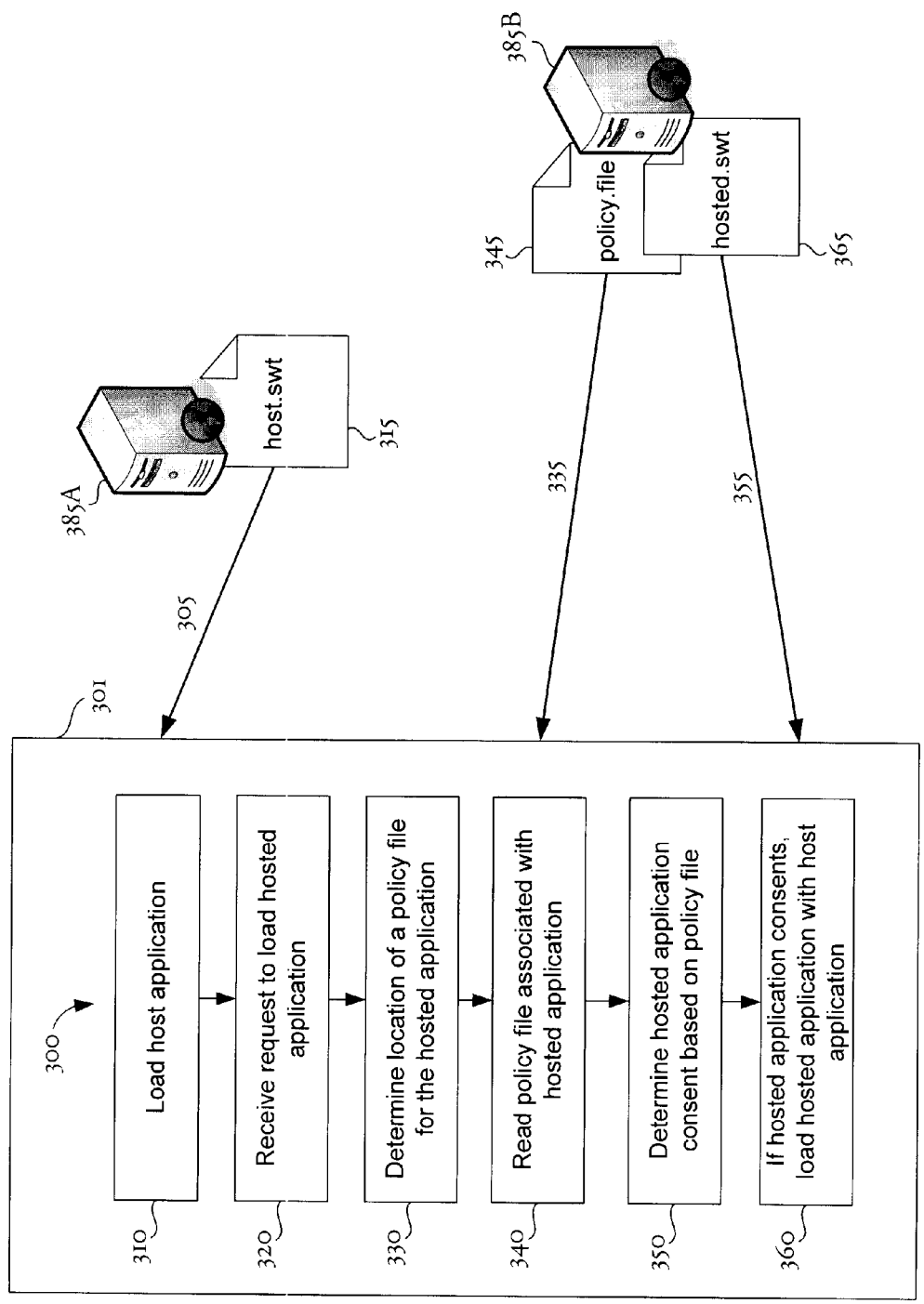
FIG. 3 is a flow diagram of an example process for determining whether a hosted application consents to being loaded by a host application.

FIG. 3 shows an example process 300 for determining whether a hosted application consents to being loaded by a host application based on a security policy file that is separate from the hosted application. The process 300, which can be performed by an application execution environment 301, loads 310 the host application. For example, the host application can be loaded from a first network-attached server 385A, which provides the encoded representation of the host application 315. To load the host application, the encoded representation 315 can be transferred 305 to the application execution environment 301 for decoding. As a part of the loading, or during the course of executing the host application, a request to load the hosted application can be received 320.

The location of a policy file related to the hosted application is determined 330. In some implementations, the location of the policy file is based on pre-determined values such as a default-location or based on a database of policy-file application associations. In some implementations, the location of the policy file is derived from the location of the encoded representation of the hosted application. For example, the location of the encoded representation may specify a particular file 365 on a second server 385B. The location of the encoded representation of the hosted application 365 can be specified in a URL such as 'http://domain.com/path/file.swt.' From this URL, a location of the policy file can be derived based on a pre-defined convention. For example, an associated policy file can be located at 'http://domain.com/path/file.policy' or 'http://domain.com/path/security.policy'. In some implementations, multiple potential policy file locations can be derived and each location accessed in sequence.

The policy file 345, which is associated with the hosted application, is read 340 by the application execution environment 301. Reading the policy file 345 can include transferring 335 the policy file from the second server 385B to the application execution environment 301. The policy file 345 includes access control directives from which the application execution environment determines whether the hosted application consents to being loaded with the host application. Access control directives specify whether particular host applications or whole classes of host applications are allowed, or not allowed, to load the application associated with the policy file. The method by which access control directives identify particular host applications or application classes vary among implementations. In general, an application can be identified by any associated information including application identifiers, publisher or author identifier, secured certification, or URLs referring to potential locations of the application. For example, a policy file can specify that all applications from the location 'http://*.adobe.com/' are allowed to load the policy file's associated application. Another policy file can specify that all applications except those from 'http://blackhat.com/' are allowed to load the associated application. In such implementations, the location from which the host application was received is compared to locations specified in the policy file. In some implementations, a hierarchy of access control directives can be derived from multiple policy files.

In some implementations, the policy file specifies a load type, which represents how an encoded representation of the application can be accessed by a host application. The load type can, for example, specify that the representation can be loaded as an application with both instructions and data. Alternatively, the load type can specify that the representation be loaded as data or playable media. When the representation of a hosted application is loaded as playable media (e.g., an animation, audio or video stream), the playable media associated with the hosted application is playable by the host application. Instructions of the hosted application cannot be referred to or executed by the host application. In some implementations, the load type can specify that a host application may call instructions of the hosted application, but not access data resources of the hosted application. Additionally, the load type can specify that the encoded representation of the application be loaded as raw data. As raw data the host application receives all or part of the encoded representation as a sequence of unstructured information (e.g., a binary file). In some implementations, the raw data can subsequently be interpreted by the application execution environment as instructions and data.

In some implementations, access control directives specified in the policy file can identify particular portions of an associated application that are accessible, or not accessible, to a host application. For example, a policy file can specify that a particular instruction reference (e.g., the method doSecureStuff) should not be accessible to any host application, while another particular data structure (e.g., the playable media content 'publicAdvertisement') is accessible to all host applications.

Based on information in the policy file 345, the application execution environment determines 350 whether or not the hosted application consents to being loaded with the host application. If the hosted application does consent, the encoded representation of the hosted application 365 is read 355 from the server 385B and loaded 360 using the same isolation environment as the host application in accordance with the policy file 345. If the hosted application does not consent, then the hosted application is not loaded and any references by the host application to the hosted application fail and, for example, causes errors to be generated (e.g., throw an exception, signal a fault or rollback a transaction).

Figure 4:
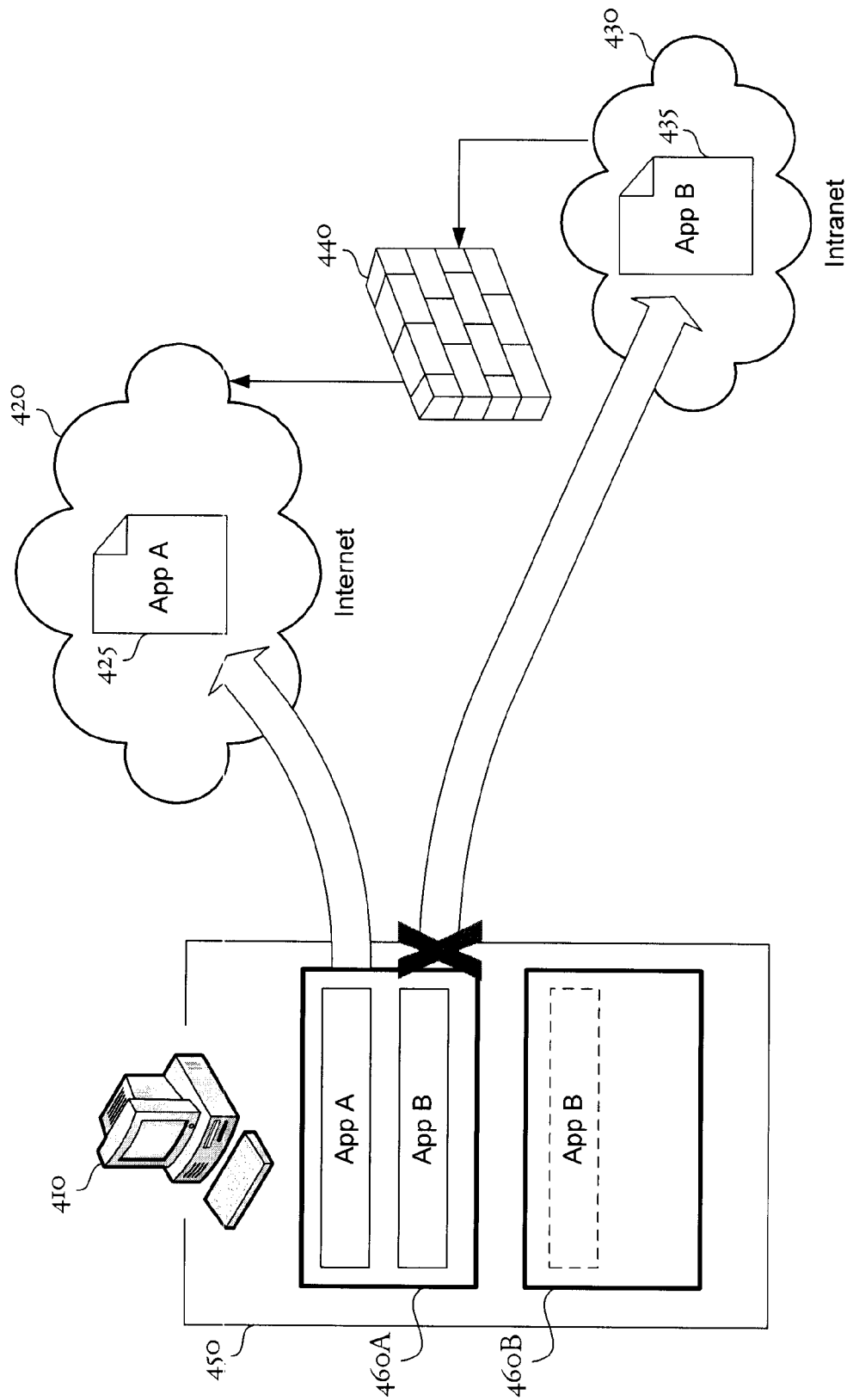
FIG. 4 shows an example application execution environment having access to several networks.

FIG. 4 shows an example application execution environment 450 with access to several networks. The application execution environment 450 can be included on computing device 410 connected to a public network 420, such as the Internet, through a private network 430, such as an intranet. Although both networks are connected to each other, a firewall 440 prevents unrestricted access between the two networks. In general, devices connected to the public network 420 are not able to access the private network 430. Note that the application execution environment 450, through device 410, is connected to both the public network 420 and the private network 430. The connection to each network can be separate, although in practice, the connection to both networks can be facilitated by a single connection (e.g., through a gateway, a virtual private network, or proxy mechanism).

By being connected to both networks, the application execution environment can potentially load applications from both networks. For example, a host application, App A, can be loaded from the public network 420 while a hosted application, App B, can be loaded from the private network 430. Both applications are loaded using the isolation environment 460A designated by information associated with App A. Although App B's designated isolation environment 460B may have access to both networks, App A's isolation environment 460A is associated with permissions that prevent either application from accessing the private network 430.

As described above, the encoded representation of an application is read, interpreted and loaded by the application execution environment and cannot be modified by the host application. However, not only is the host application prevented from modifying the hosted application's encoded representation 435, the host application is prevented from even reading the hosted application's encoded representation 435. Thus the host application is allowed to use the functionality of an otherwise private application, but doing so does not circumvent the firewall 440 or allow the hosted application's encoded representation to become accessible to the host application.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 5:
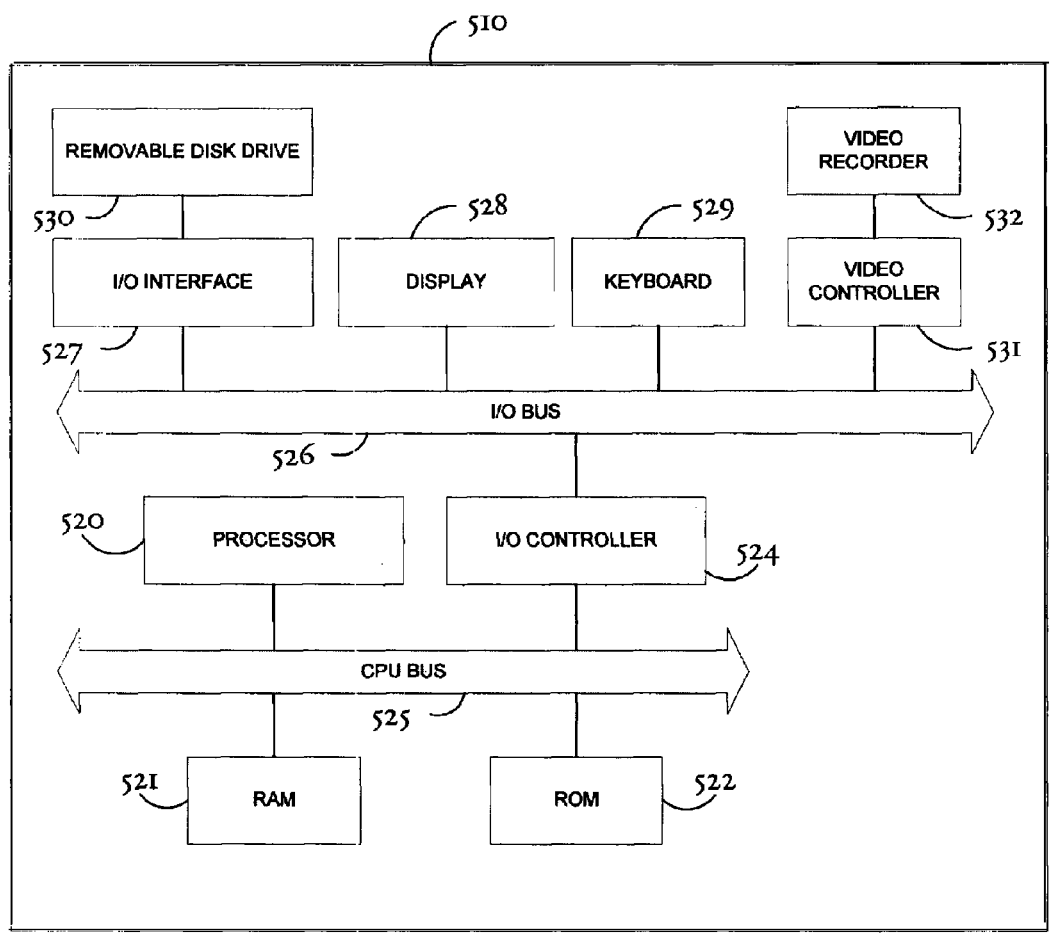
FIG. 5 is a schematic diagram of a generic computer system.
Figure 5:
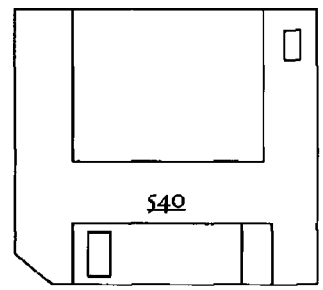

An example of one such type of computer is shown in FIG. 5, which shows a block diagram of a programmable processing system (system) 510 suitable for implementing apparatus or performing methods of various aspects of the subject matter described in this specification. The system 510 includes a processor 520, a random access memory (RAM) 521, a program memory 522 (for example, a writable read-only memory (ROM) such as a flash ROM), a video controller 531, and an input/output (I/O) controller 524 coupled by a processor (CPU) bus 525. The system 510 can be preprogrammed, in ROM, for example, or it can be programmed (and reprogrammed) by loading a program from another source (for example, from a floppy disk 540, a CD-ROM, or another computer).

The I/O interface 527 is coupled to a hard disk 530 suitable for storing executable computer programs, including programs embodying aspects of the subject matter described in this specification, and data (e.g., an encoded representation of an application).

The video controller 531 is coupled to a video recorder 532, which can be used for storing and importing video footage and for writing final output. The I/O controller 524 is coupled by means of an I/O bus 526 to an I/O interface 527. The I/O interface 527 receives and transmits data (e.g., information, stills, pictures, movies, and animations for importing into a composition) in analog or digital form over communication links such as a serial link, local area network, wireless link, and parallel link. Also coupled to the I/O bus 526 is a display 528 and a keyboard 529. Alternatively, separate connections (separate buses) can be used for the I/O interface 527, display 528 and keyboard 529.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:

loading a first application using a first isolation environment provided by an application execution environment, the first application being designated to the first isolation environment;

receiving a request from the first application to load a second application;

determining that the second application consents to being loaded using the first isolation environment, the consent based at least in part on security policy information associated with the second application including an access control directive that specifies whether the first application is allowed to load the second application, said determining that the second application consents to being loaded using the first isolation environment includes matching the first isolation environment with the security policy information;

loading the second application as playable media, playable by the first application, using the first isolation environment despite the second application being designated to a second isolation environment provided by the application execution environment;

processing data using first instructions included in the first application and second instructions included in the second application, where the processing includes using the first instructions of the first application to invoke functionality provided by the second instructions of the second application; and outputting information based on a result of the processing.

2. The method of claim 1, wherein:

loading the first application comprises loading the first application from a first network location; and loading the second application comprises loading the second application from a second network location, the second network location being distinct from the first network location.

3. The method of claim 2, wherein:

the first network location is a public network; and
the second network location is a private network.

4. The method of claim 2, further comprising:

loading the second application as raw data accessible to the first application.

5. The method of claim 2, wherein:

the first application is prevented from at least one of:

reading the second instructions of the second application, and modifying the second instructions of the second application.

6. The method of claim 2, further comprising:

identifying, based on permissions associated with the first isolation environment, which environment resources in a plurality of environment resources are accessible to applications loaded in the first isolation environment.

7. A system comprising:

a processor;

a computer-readable medium coupled with the processor and having encoded thereon an application execution environment configured to load applications while running on the processor;

the application execution environment configured to load a first application using a first isolation environment provided by the application execution environment, the first application being designated to the first isolation environment;

the application execution environment configured to receive a request from the first application to load a second application;

the application execution environment configured to determine that the second application consents to being loaded using the first isolation environment, the consent based at least in part on security policy information associated with the second application including an access control directive that specifies whether the first application is allowed to load the second application, the application execution environment configured to match the first isolation environment with the security policy information to said determine that the second application consents to being loaded using the first isolation environment;

the application execution environment configured to load the second application as playable media, playable by the first application, using the first isolation environment despite the second application being designated to a second isolation environment provided by the application execution environment;

the application execution environment configured to process data using first instructions included in the first application and second instructions included in the second application, where the processing includes using the first instructions of the first application to invoke functionality provided by the second instructions of the second application; and the application execution environment configured to output information based on a result of the processing.

8. The system of claim 7, wherein the application execution environment is configured to:

load the first application from a first network location; and load the second application from a second network location, the second network location being distinct from the first network location.

9. The system of claim 8, wherein:

the first network location is a public network; and
the second network location is a private network.

10. The system of claim 8, wherein the application execution environment is further configured to load the second application as raw data accessible to the first application.

11. The system of claim 8, wherein the application execution environment is configured to prevent the first application from at least one of:

reading the second instructions of the second application, and modifying the second instructions of the second application.

12. The system of claim 8, wherein the application execution environment is configured to:

identify, based on permissions associated with the first isolation environment, which environment resources in a plurality of environment resources are accessible to applications loaded in the first isolation environment.

13. A computer program product, encoded on a non-transitory computer-readable medium, operable to cause a data processing apparatus to perform operations comprising:
- loading a first application using a first isolation environment provided by an application execution environment, the first application being designated to the first isolation environment;
- receiving a request from the first application to load a second application;
- determining that the second application consents to being loaded using the first isolation environment, the consent based at least in part on security policy information associated with the second application including an access control directive that specifies whether the first application is allowed to load the second application, said determining that the second application consents to being loaded using the first isolation environment includes matching the first isolation environment with the security policy information;
- loading the second application as playable media, playable by the first application, using the first isolation environment despite the second application being designated to a second isolation environment provided by the application execution environment;
- processing data using first instructions included in the first application and second instructions included in the second application, where the processing includes using the first instructions of the first application to invoke functionality provided by the second instructions of the second application; and
- outputting information based on a result of the processing.

14. The program product of claim 13, wherein:
- loading the first application comprises loading the first application from a first network location; and
- loading the second application comprises loading the second application from a second network location, the second network location being distinct from the first network location.

15. The program product of claim 14, wherein:
- the first network location is a public network; and
- the second network location is a private network.

16. The program product of claim 14, the operations further comprising:
- loading the second application as raw data accessible to the first application.

17. The program product of claim 14, wherein:
- the first application is prevented from at least one of:
- reading the second instructions of the second application, and
- modifying the second instructions of the second application.

18. The program product of claim 14, the operations further comprising:
- identifying, based on permissions associated with the first isolation environment, which environment resources in a plurality of environment resources are accessible to applications loaded in the first isolation environment.

* * * * *